July 1, 1941.   G. C. PAPENDICK   2,247,695
PACKAGING OF BAKED BREAD LOAVES
Filed Nov. 25, 1938   4 Sheets-Sheet 1

INVENTOR
GUSTAV C. PAPENDICK
BY
ATTORNEY

July 1, 1941.　　　G. C. PAPENDICK　　　2,247,695
PACKAGING OF BAKED BREAD LOAVES
Filed Nov. 25, 1938　　　4 Sheets-Sheet 2
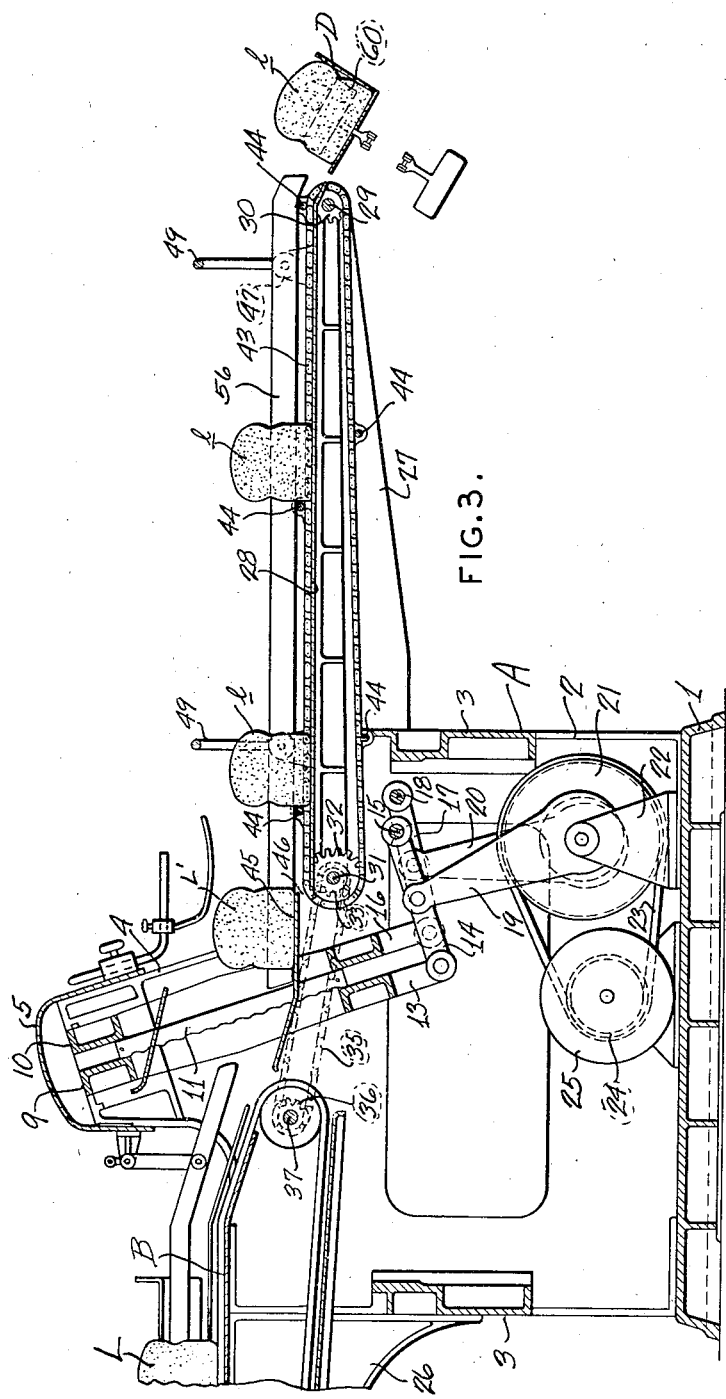
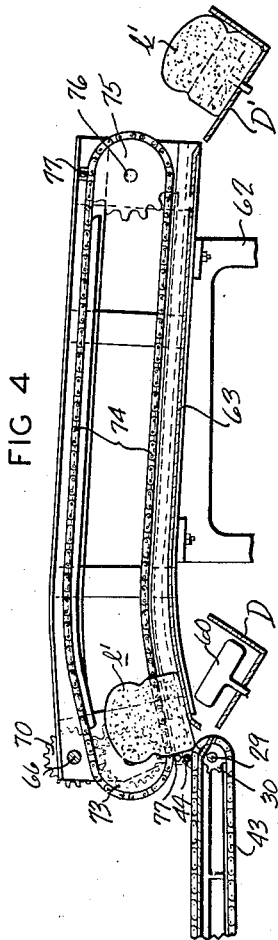
INVENTOR
GUSTAV C. PAPENDICK
BY
ATTORNEY

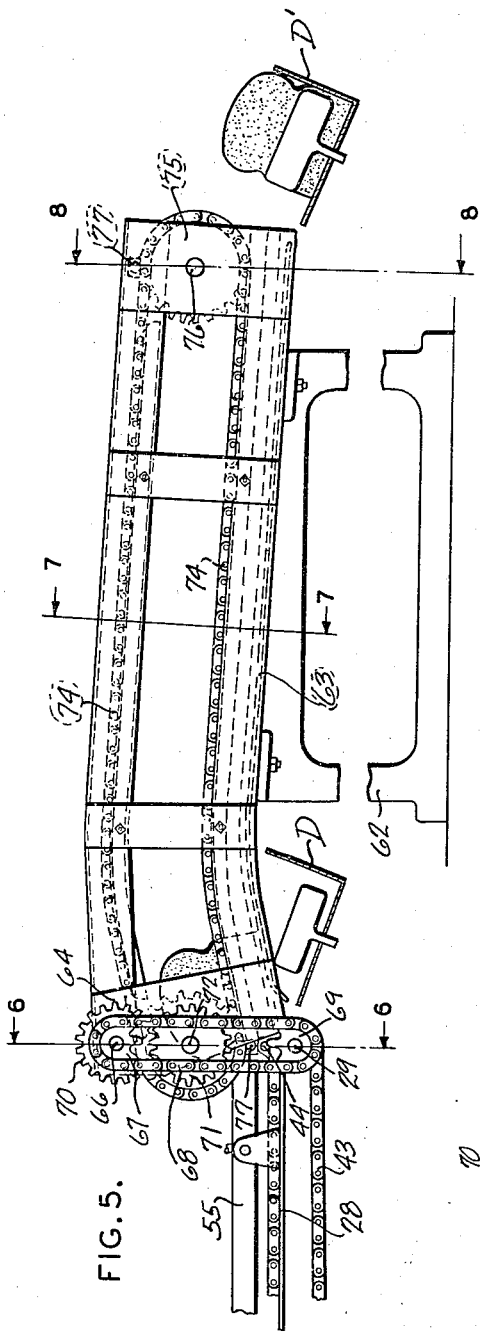
July 1, 1941.  G. C. PAPENDICK  2,247,695
PACKAGING OF BAKED BREAD LOAVES
Filed Nov. 25, 1938  4 Sheets-Sheet 3
INVENTOR
GUSTAV C. PAPENDICK
BY
ATTORNEY Patented July 1, 1941

2,247,695

UNITED STATES PATENT OFFICE 2,247,695

PACKAGING OF BAKED BREAD LOAVES

Gustav C. Papendick, University City, Mo.; Elizabeth Papendick executrix of Gustav C. Papendick, deceased, assignor to Papendick, Inc., St. Louis, Mo., a corporation of Missouri Application November 25, 1938, Serial No. 242,434

14 Claims. (Cl. 146—153)

This invention relates in general to the packaging of baked bread-loaves and, more particularly, to certain new and useful improvements in methods and means for fractionally packaging sliced bread-loaves.

At the present time, bread consumers not only predominantly demand wrapped sliced baked loaves, but also desire that the bread slices when served be fresh and soft, with the result that considerable demand has arisen for small size loaf packages. It has been found, however, that it is difficult to maintain maximum high qualities of taste and texture in baked loaves of relatively small size. Furthermore, labor costs in the bread baking process constitute an extremely large portion of the entire manufacturing cost and are substantially the same per unit for either a wrapped small loaf or a wrapped large loaf. It will hence be evident that the production cost of wrapped smaller loaves will of necessity be disproportionately large with respect to the cost of the larger loaf.

My invention has for its primary objects the provision not only of a method of packaging small size loaf packages which economically meets the situation and overcomes the difficulties stated, but also of mechanism for fractionating and packaging the bread-loaves, which may be readily constructed, which is high-speed in operation and simultaneously effects feeding of bread-loaf fractions into two simultaneously operating wrapping machines, and which is highly efficient in the performance of its stated functions.

And with the above and other objects in view, my invention resides in the novel features of form, construction, arrangement, and combination of parts presently described and pointed out in the claims.

In the accompanying drawings (4 sheets):

Figure 3 is a fragmentary vertical sectional view of the mechanism, taken approximately along the line 3—3, Figure 1;

Figure 4 is a vertical sectional view of the mechanism, taken approximately along the line 4—4, Figure 1;

Figure 5 is a fragmentary side elevational view of the carry-over portion of the mechanism;

Figure 9:
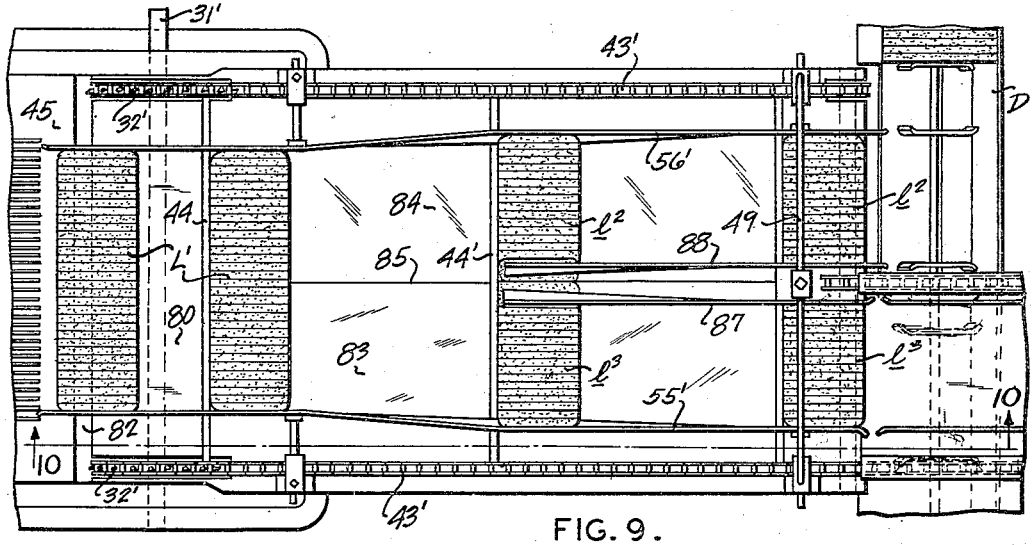
Figure 10:
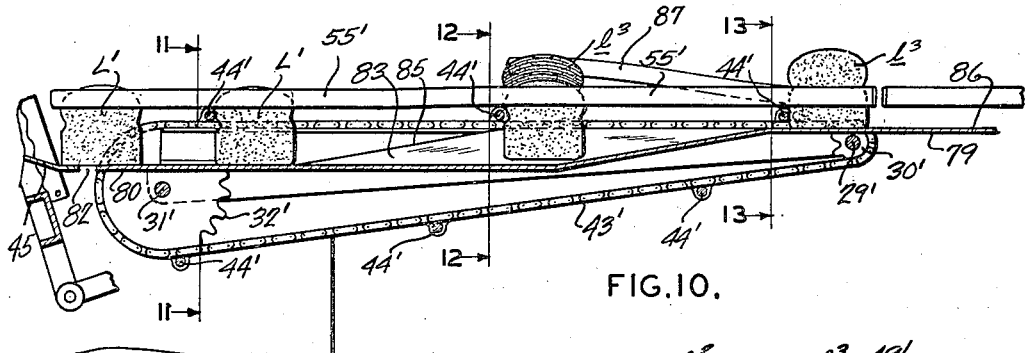
Figure 11:
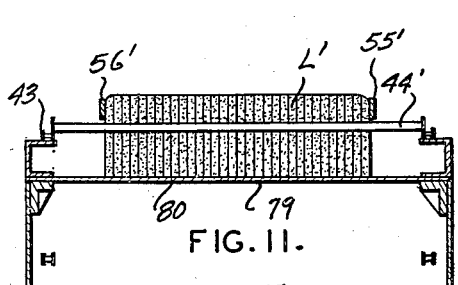
Figure 13:
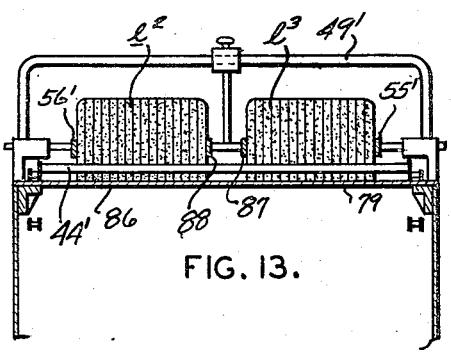
Figure 12:
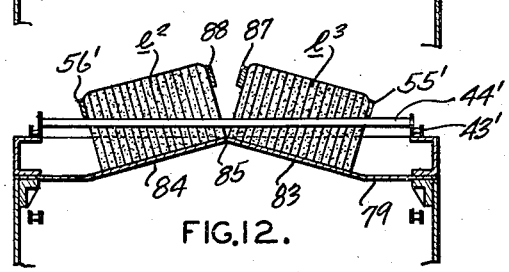

Figures 6, 7, and 8 are transverse vertical sectional views of the carry-over mechanism, taken approximately along the lines 6—6, 7—7, and 8—8, respectively, Figure 5;

Figure 9 is a top plan view of a modified form of loaf fractionating mechanism embodying my invention;

Figure 10 is a fragmentary longitudinal sectional view of the modified fractionating mechanism, taken approximately along the line 10—10, Figure 9; and Figures 11, 12, and 13 are transverse vertical sectional views of the modified fractionating mechanism, taken approximately along the lines 11—11, 12—12, and 13—13, respectively, Figure 10.

Referring now in more detail and by reference characters to the drawings, which illustrate practical embodiments of my present invention, A designates a loaf slicing mechanism preferably of the vertically reciprocating knife type, which includes a base 1 having a pair of spaced parallel upstanding side frame members 2 transversely connected along their forward and rearward margins by a pair of cross frame members 3. Extending upwardly from the upper horizontal margins of each of the side frames 2, are side columns 4 transversely connected by a horizontally extending U-shaped head cover 5. Rigidly mounted on the inwardly presented faces of the side frames and extending upwardly along the side columns 4 thereof, are parallel way blocks 6 each having a pair of laterally spaced parallel slide grooves 7 formed therein for operatively receiving bearing blocks 8 mounted on the vertical side margins of knife frames 9, 10, the latter being each removably provided with a suitable set of spaced parallel knife blades 11, 12.

Along its lower margin, the knife frame 9 is provided with a downwardly projecting arm 13, which is pivotally connected to one extremity of a rock arm 14, in turn, at its lower extremity swingably mounted on a pivot rod 15 operatively disposed between the side frames 2 and similarly along its lower margin the knife frame 10 is provided with a downwardly extending arm 16 spaced laterally from the arm 13 of the knife frame 9 and pivotally connected to one extremity of a rock arm 17 which is likewise laterally spaced from the rock arm 14 and is, in turn, at its other extremity swingably connected to a pivot rod 18 suitably disposed between the side frames 2. Intermediate their respective ends, the rock arms 14, 17, are pivotally connected respectively to connecting rods 19, 20, the latter being operatively mounted in a drive-wheel 21, which is journaled between journal brackets 22 and is connected by means of a belt 23 to a drive pulley 24 of an electric motor 25 mounted on the base 1 and connected in any conventional manner to a suitable source of electric power (not shown).

Mounted rigidly on, and extending rearwardly from, the side frames 2, are opposed parallel arms 26 arranged for operatively supporting a feed conveyer mechanism B preferably, though not necessarily, of the continuous belt type, all as best seen in Figure 3 and for purposes presently more fully appearing.

Mounted rigidly on, and extending forwardly from, the side frames 2, is a pair of opposed parallel arm members 27 arranged for supporting a preferably horizontal flat-surfaced conveyer table 28. Journaled at respectively opposite ends in, and extending horizontally beneath, the discharge end of the conveyer table 28, is a shaft 29 provided with two spaced sprocket members 30 respectively positioned slightly inwardly of the side margins of the conveyer table 28.

Figure 1:
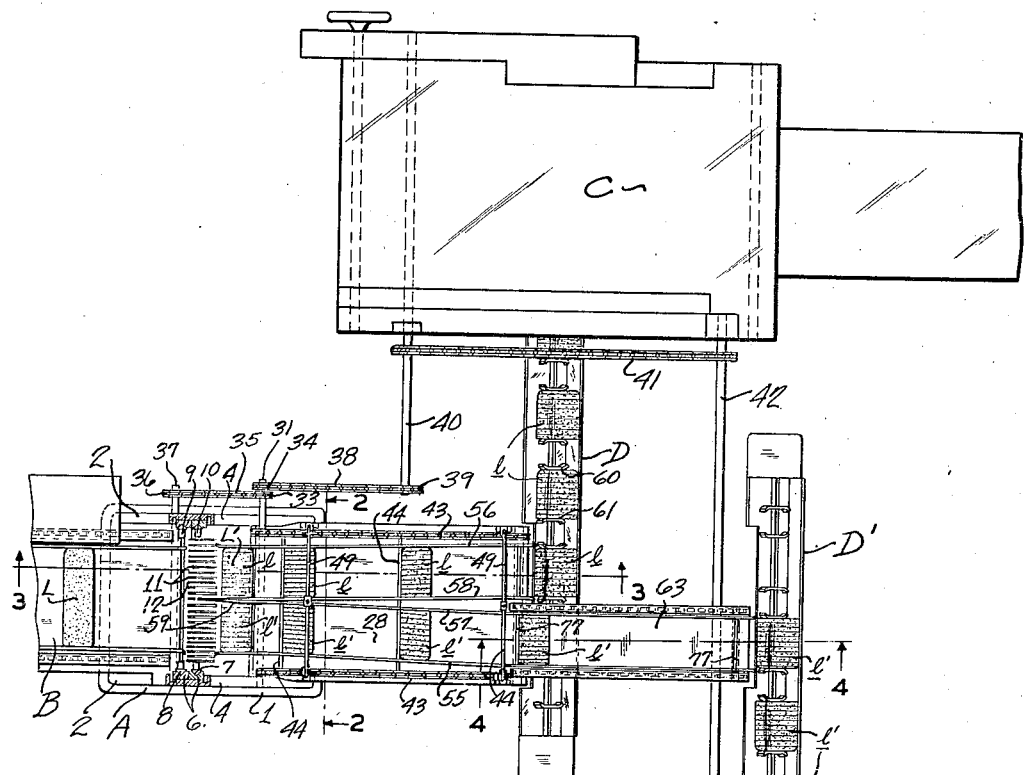
Figure 1 is a top plan view of a bread-loaf fractionating and wrapping mechanism constructed in accordance with and embodying my present invention.

Similarly journaled at its one end in one of the side frames 27 and extending rotatively through the other side frame 27 in underlying horizontal position beneath the inner or rearward end of the conveyer table 28, is a driven shaft 31 provided with two sprockets 32 respectively in parallel alignment with the sprockets 30 and being further provided at its extended end with spaced sprockets 33, 34, the sprocket 33 being connected by a drive chain 35 to the sprocket 36 of the drive shaft 37 of the feed conveyer B. The sprocket 34 is similarly connected by a drive chain 38 to a sprocket 39 mounted rigidly on the extended end of a main drive shaft 40 connected to a suitable prime mover (not shown), which directly supplies motive power to the wrapping machine C and, at the same time, through the drive chain 41 and the shaft 42 supplies the motive power for the wrapping machine C', so that the feed conveyer B of the slicing machine A and the two wrapping machines C, C', are all synchronized for movement at predetermined speed relationships, as best seen in Figure 1 and for purposes presently more fully appearing.

Trained over the peripherally aligned sets of sprockets 30, 32, are flight chains 43 having an upper run extending above the conveyer table 28 and a lower returning run extending below the conveyer table. Mounted at their ends at uniformly spaced points on, and extending horizontally between the flight chains 43, is a plurality of flight rods 44, as best seen in Figure 3.

Rigidly mounted at its ends on, and extending horizontally between, the side frames 2 and on the discharge side of the slicing knives 11, 12, is a delivery plate 45 spaced a short distance upwardly from and at its forwardly presented transverse margin extending over the inner or rearward margin of the conveyer table 28 in the provision of a free space 46 of sufficient size to permit the flight rods to move freely upwardly around the sprockets 32 across the upper face of the conveyer table 28.

Figure 2:
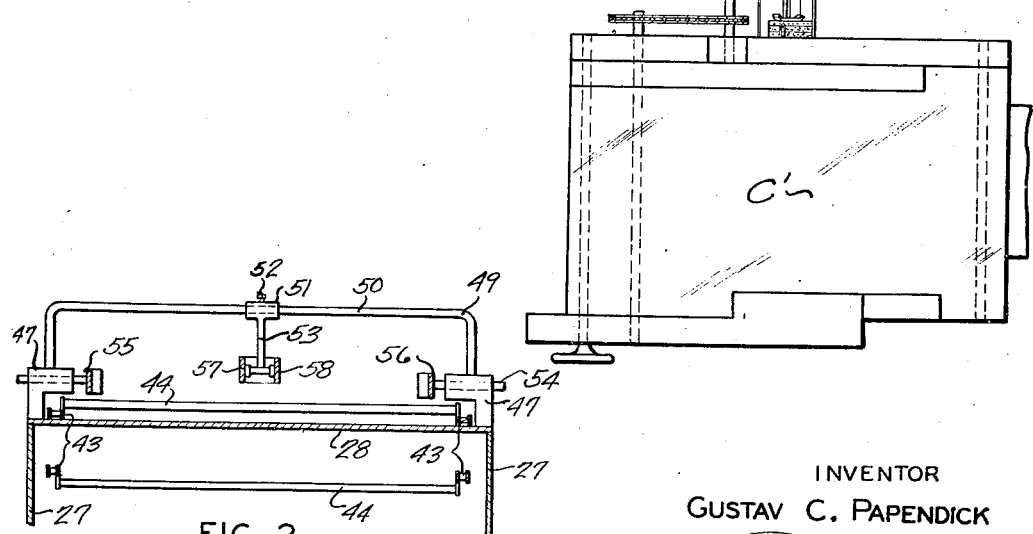
Figure 2 is a fragmentary horizontal sectional view of the mechanism, taken approximately along the line 2—2, Figure 1.

Rigidly mounted in axially aligned juxta-position respectively on the upper margins of the conveyer supporting arms 27 adjacent the rearward or inner ends thereof, is a pair of horizontally bored supporting blocks 47. Similarly mounted in axially aligned juxta-position respectively on the upper margins of the conveyer supporting arms 27 adjacent the forward or discharge ends thereof, is a second pair of supporting blocks 48. Rigidly mounted on the upper faces of each of the pairs of supporting blocks 47, 48, and extending transversely therebetween, is a U-shaped bridge member 49 having a horizontal bight portion extending over and above the conveyer table 28. Slidably mounted on the bight portion 50 is a sleeve member 51 provided with a set screw 52 for securing the sleeve at any adjusted position along the bight member 50, the sleeve being further integrally provided with a downwardly extending hanger arm 53, all as best seen in Figure 2 and for purposes presently more fully appearing.

Adjustably mounted in the axially bored support blocks 47, 48, are horizontal rod members 54. Preferably welded or otherwise rigidly secured to the inner ends of, and extending longitudinally along and above, the upper face of the conveyer table 28, are opposed parallel side guide members 55, 56, at their inner or rearward ends extending over the delivery plate 45 and terminating adjacent the slicer knives 12. The guide members 55, 56, furthermore extend forwardly and parallel to each other for a short distance toward the discharge end of the conveyer table 28 and are thence bent slightly outwardly away from each other for substantially the entire length of the conveyer table 28, being bent backwardly into parallelism for a short distance just adjacent the discharge end of the conveyer table 28, all as best seen in Figure 1.

Welded or otherwise fixed to the lower ends of the hanger arms 53 and extending longitudinally therebetween along and over the upper face of the conveyer table 12, is a pair of intermediate guide members 57, 58, respectively parallel to the guide members 55, 56, at their inner or rearward ends being formed together in the provision of a relatively thin blade-like divider member 59 extending over the delivery plate 45 and terminating adjacent the slicing knives 12 in alignment with one of said slicing knives for entering and dividing the bread-loaf at a predetermined sliced cut, all as best seen in Figure 1.

Suitably mounted adjacent the discharge end of the conveyer table 28 and extending preferably at right angles to the longitudinal axis thereof, is a wrapping machine conveyer D having a plurality of chain driven spaced companion pairs of loaf grippers 60, 61, arranged in the formation of loaf-receiving pockets and actuated preferably by a conventional Geneva drive or intermittent movement mechanism whereby at each cycle of the machine a particular pair of loaf gripper members 60, 61, are moved forwardly one space of division into respective longitudinal alignment with the guide members 56, 58, and brought to a stop, as best seen in Figure 1 and for purposes presently more fully appearing.

Positioned adjacent the wrapping machine conveyer D on the opposite side thereof from the conveyer table 28, is a pedestal member 62 provided at its upper end with a carry-over plate or table 63 extending rearwardly at one end over the wrapping conveyer D and terminating adjacent the discharge end of the conveyer table 28, being spaced therefrom by a sufficient distance to permit the flight rods 44 to pass freely around the end of and beneath the conveyer table 28. Along its side margins, the carry-over plate 63 is provided with a pair of upstanding parallel side plates 64, 65. Journaled in and extending horizontally through the side plates 64, 65, is a shaft member 66, provided at its one extended end with a sprocket member 67, which is, in turn, connected by a chain 68 to a driving sprocket 69 operatively mounted on the end of the transfer conveyer shaft 29. The shaft 66 is further provided along that portion of its one extended end between the side plate 64 and the sprocket 67 and also along its other extended end outwardly from the side plate 65 with identical driving gears 70, which respectively have meshing engagement with gears 71 pinned to short axially aligned shafts 72, which are, in turn, journaled in the side plates 64, 65, and are provided on their inwardly extended ends with sprocket members 73 for operatively supporting the sprocket chain 74 trained therearound and extending forwardly therealong and around the idle sprockets 75, which are, in turn, rotatably mounted on stub shafts 76 rigidly mounted in the side plates 64, 65, adjacent the forward ends thereof, all as best seen in Figures 5, 6, 7, and 8.

Operatively mounted at their ends at spaced points along the chains 74 and extending horizontally therebetween, is a plurality of spaced parallel flight rods 77 for shifting the breadloaves over and along the carry-over plate 63. The carry-over plate 63 is further provided with a pair of parallel upstanding loaf guides 78 of sufficient height to properly guide the loaf and yet not being so high as to extend upwardly into the path or otherwise interfere with the free operation of the flight rods 77, all as best seen in Figures 7 and 8.

Positioned adjacent, and extending preferably at right angles to, the carry-over plate 63, is a wrapping machine conveyer D' substantially identical in all respects to the previously described wrapping machine conveyer D and arranged for transporting bread-loaf fractions into the wrapping machine C', all as best seen in Figure 1 and for purposes presently more fully appearing.

In use, the baked unsliced bread-loaves L are successively placed upon the feed-conveyer B and progressed thereby at a predetermined rate of speed in synchronism with the operation of the wrapping machines C, C', through the slicing knives 11, 12, and outwardly upon the delivery plate 45. As the sliced loaves L' issue upon the the delivery plate 45, the rearward or inner ends of the side guides 55, 56, engage the "heel" or outer ends of the respective loaves L' and prevent the slices thereof from falling over or the several loaves from becoming otherwise dissociated. At the same time, the blade-like end portion or divider plate 59 of the intermediate guide members 57, 58, enters and divides each successive loaf L' at a slice-cut into two separate and distinct fractions or loaf sections $l$, $l'$. Under the influence of the successive breadloaves L, which are being fed through the slicing knives 11, 12, by the feed conveyer B, the particular sliced bread-loaf L' upon the delivery plate 45 will be urged or propelled forwardly over the edge of the delivery plate and drop downwardly upon the upper surface of the transfer conveyer table 28. Meanwhile, one of the flight rods 44 moves upwardly from beneath the transfer conveyer table 28 and simultaneously engages the two individual loaf sections $l$, $l'$, progressing them forwardly across the transfer conveyer at a rate of speed which is preferably more rapid than the speed of the feed conveyer B. The fraction $l$ is held between the side guide 56 and the intermediate guide 58. Similarly, the fraction $l'$ is held between the side guide 55 and the intermediate guide 57. By reference to Figure 1, it will be evident that as the particular loaf fractions $l$ $l'$, are progressed forwardly over the upper face of the transfer conveyer table 28, said particular fractions $l$, $l'$, will also be shifted axially away from each other. It will also be evident that, as the particular flight rod 44 reaches the discharge end of the transfer conveyer table 28, it will move downwardly and return from beneath, discharging the one loaf section $l$ into a pair of loaf grippers 60, 61, of the wrapping machine conveyer D, which have momentarily come to rest in alignment therewith, as above described. Simultaneously, the other fraction $l'$ will be shifted onto the rearward end of the carry-over plate 63. As said loaf fraction $l'$ moves onto the carry-over plate 63, one of the carry-over flight rods 77 will move downwardly into abutting engagement with said loaf-fraction $l'$ and progress the same forwardly over the carry-over plate 63 between the loaf guide members 78 thereof and discharge such loaf fraction $l'$ into one of the loaf-receiving pockets of the wrapping machine conveyer D' which has come to rest momentarily in alignment therewith for transporting the particular loaf fraction $l'$ into the wrapping machine C' for mechanical wrapping or other handling in any conventional manner.

If it is desirable for any reason to obviate the use of the divider plate mechanism for splitting the successive loaves into a plurality of fractions, I may provide a conveyer table 79 having a rearward horizontal portion 80 extending forwardly from and on the same plane with the delivery plate 45 and having its rearwardly presented transverse margin spaced forwardly from the margin of the discharge plate for a substantial distance in the provision of an aperture or slot 82, all as best seen in Figure 10 and for purposes presently more fully appearing.

Along its mid-section, the conveyer table 79 is deformed upwardly in a shallow V having two inclined faces 83, 84, separated by a ridge line 85 and ultimately at their forward ends being deformed or bent again into a flat horizontal plane-surfaced portion 86 substantially above the level of the rearward portion 80 of the conveyer table 79. The side guide members 55', 56', are mounted and formed in substantially the same manner as the previously described side guides 55, 56, being at the rearward end of the conveyer table parallel for a substantial distance and being angularly bent outwardly approximately at the points in transverse alignment with the point at which the deformation of the conveyer table 79 begins and being preferably twisted slightly out of the vertical to lie in a plane at right angles to the planes of the inclined conveyer table portions 83, 84, respectively. The side guides 55', 56', furthermore extend horizontally above the forward horizontal portion 86 of the conveyer table 79 and, accordingly, are spaced a substantially large distance above the rearward horizontal portion 80 of the conveyer table 79, all as best seen in Figure 10 and for purposes presently more fully appearing.

Suitably journaled in the side frames 21 and extending horizontally beneath the conveyer table respectively adjacent the forward and rearward ends thereof, are shafts 29', 31', substantially similar in all respects to the previously described shafts 29, 31. The shafts 29', 31', are similarly provided with sprocket members 30', 32', respectively, the sprocket 32' being substantially larger in diameter than the sprocket 30', so that the conveyer chains 43' trained therearound will extend rearwardly and downwardly beneath the table but will move upwardly around the sprocket 32' and extend horizontally forwardly around the sprocket 30', thus being spaced substantially upwardly from the rearward horizontal portion 80 of the conveyer table 79, all as best seen in Figure 10 and for purposes presently more fully appearing.

Suitably supported by a U-shaped bridge member 49', substantially similar in all respects to the bridge member 49 previously described, is a pair of parallel intermediate guide members 87, 88, terminating at their forward ends approximately above the point at which the ridge line 85 intersects the forward horizontal portion 86 of the conveyor table 79 and extending rearwardly over the horizontal portion 86 of the conveyer table 79 to a point substantially adjacent the forward or discharge end thereof. At their rearward ends, the intermediate guides 87, 88, are bent or twisted into planes respectively parallel with the opposed non-vertical portions of the side guides 55', 56', respectively, and extend forwardly in parallelism therewith, being ultimately bent back into vertical planes at right angles to the horizontal portion 86 of the conveyer table 79 to conform to the vertical forward portions of the side guides 55', 56', respectively, all as best seen in Figure 9 and for purposes presently more fully appearing.

In use, the sliced bread-loaves L' issuing from the delivery plate 45 move onto the rearward horizontal portion 80 of the conveyer table 79, at which point each sliced bread-loaf L' is picked up by a particular flight rod 44' and moved rapidly over the upper face of the conveyer table 79 between the side guides 55', 56'. As each sliced bread-loaf L' reaches the ridge member 85, it is bent upwardly in its middle, so to speak, and is automatically separated into two fractions which move across the inclined portions 83, 84, of the conveyer table 79, as best seen in Figure 12. As the loaf-fractions l², l³, move forwardly, the intermediate guides 87, 88, respectively engage the inclined outwardly presented crustless end faces of the loaf-fractions l², l³, and prevent the same from becoming dissociated as they ride upwardly off of the inclined portions 83, 84, onto the upper forward horizontal portion 86' of the conveyer table 79, as best seen in Figure 10.

It will thus be evident that as the sliced bread-loaves L' move over the deformed mid-section, they will be split into two separate fractions l², l³, which will, in turn, actually be shifted away from each other axially for delivery into the wrapping machine conveyer D and the carry-over plate 63, as above described.

The method and mechanism described fulfill in every respect the objects stated, and it should be understood that variations in the various steps of the method and changes and modifications in the form, construction, arrangement, and combination of the several parts of the mechanism may be made and substituted for those herein shown and described without departing from the nature and principle of my invention.

Having thus described my invention, what I claim and desire to secure by Letters Patent is:

1. In bread-packaging mechanism, a carry-over conveyer comprising a base for shiftably supporting bread-loaf fractions and having a pair of opposed parallel guide members for confining the bread-loaf fractions to a predetermined path of movement, and conveyer means operably mounted on and spaced upwardly from the base for progressing the loaf fractions over the base, said conveyer means being of the endless type and having a loaf-engaging run and a return run, said return run being positioned on the opposite side of the loaf-engaging run and away from the path of movement of the loaf fractions with respect to the base.

2. In sliced loaf packaging mechanism, loaf fractionating means comprising a conveyer table adapted to support a plurality of bread-loaves for travel therealong, said table having rearward and forward flat portions and an intermediate portion deformed in the provision of a ridge extending in the direction of travel of the bread-loaves and adapted to bend the sliced loaf about a line parallel to the path of loaf-movement for breaking the loaf into separate fractions during movement over the deformed portion of said table.

3. In sliced loaf packaging mechanism, loaf fractionating means comprising a conveyer table adapted to support a plurality of bread-loaves for slidable movement thereacross, said table having two parallel flat end portions and an intermediate deformed portion including an outwardly presented ridge extending in the direction of loaf travel for causing the sliced loaf to bend and break apart into a plurality of fractions as it progresses thereover.

4. In sliced loaf packaging mechanism, loaf fractionating means comprising a conveyer table adapted to support a plurality of bread-loaves for slidable movement thereacross, said table having forward and rearward flat portions positioned respectively in spaced parallel planes and an inclined intermediate section deformed in the provision of a ridge extending in the direction of loaf travel for causing the sliced loaf to break apart into a plurality of separate fractions as it is progressed thereover.

5. In sliced loaf packaging mechanism, loaf fractionating means comprising a conveyer table having forward and rearward flat portions positioned respectively in spaced parallel planes and an intermediate portion including a pair of longitudinally intersecting inclined portions positioned angularly with respect to each other and with respect to the flat portions in the provision of a longitudinally extending ridge for causing the sliced loaf to break apart into a plurality of fractions as it is progressed thereover.

6. In sliced loaf packaging mechanism, loaf fractionating means comprising a conveyer table adapted to support a plurality of bread-loaves for slidable movement thereacross, said table having two parallel flat end portions and an intermediate deformed portion including an outwardly presented ridge extending in the direction of loaf travel for causing the sliced loaf to bend and break apart into a plurality of fractions as it progresses thereover, and means for progressing sliced loaves over said table.

7. In sliced loaf packaging mechanism, loaf fractionating means comprising a conveyer table adapted to support a plurality of bread-loaves for slidable movement thereacross, said table having forward and rearward flat portions positioned in spaced parallel planes and an inclined intermediate section deformed in the provision of a ridge extending in the direction of loaf travel for causing the sliced loaf to break apart into a plurality of separate fractions as it is progressed thereover, and means for progressing sliced loaves over said table.

8. In sliced loaf packaging mechanism, loaf fractionating means comprising a conveyer table having forward and rearward flat portions positioned respectively in spaced apart parallel planes and an intermediate portion including a pair of longitudinally intersecting inclined portions positioned angularly with respect to each other and with respect to the flat portions in the provision of a longitudinally extending ridge for causing the sliced loaf to break apart into a plurality of fractions as it is progressed thereover, and means for progressing sliced loaves over said table.

9. The method of fractionating sliced bread-loaves which comprises progressing the sliced bread-loaf forwardly, simultaneously bending the bread-loaf along a slice cut whereby to cause the bread-loaf to fall into a plurality of fractions, and subsequently bringing the loaf fractions back into axial alignment during forward progressive movement while preserving therebetween the spaced relationship introduced by the bending operation.

10. Bread-loaf handling mechanism for handling a loaf delivered from a slicing means, a transfer conveyor mounted on the discharge side of the slicing means for receiving and transporting the sliced loaf from the slicing means, means cooperably associated with the transfer conveyor for sub-dividing the sliced loaf into a plurality of fractions as it is transported by said transfer conveyor, and means operable in timed relation to the operation of the transfer conveyor for spacially separating the loaf fractions after the loaf has been sub-divided and transporting the several fractions of each loaf along divergent paths for separate delivery at spaced positions for subsequent packaging operations.

11. Bread-loaf handling mechanism for handling a loaf delivered from a slicing means, a transfer conveyor mounted on the discharge side of the slicing means for receiving and transporting the sliced loaf from the slicing means, means cooperably associated with the transfer conveyor for sub-dividing the sliced loaf into a plurality of fractions as it is transported by said transfer conveyor, means also associated with the transfer conveyor for causing the sub-divided fractions to move along separate initial paths and separate means interposed in each of said initial paths and operable in timed relation to each other for receiving the several loaf-fractions and shifting them along paths different from their initial paths for delivery at spaced positions for subsequent packaging operations.

12. Bread-loaf handling mechanism for handling a loaf delivered from a slicing means, a transfer conveyor mounted on the discharge side of the slicing means for receiving and transporting the sliced loaf from the slicing means, means cooperably associated with the transfer conveyor for sub-dividing the sliced loaf into a plurality of fractions as it is transported by said transfer conveyor, and means operable in timed relation to the operation of the transfer conveyor for spacially separating the loaf-fractions after the loaf has been subdivided and transporting the several fractions of each loaf along paths respectively disposed in spaced planes for separate delivery at spaced positions for subsequent packaging operations.

13. In bread-packaging mechanism, a table adapted to support a plurality of bread-loaves for slidable movement thereacross, said table having, intermediate its ends, a bend extending in the direction of travel of the bread-loaves for subdividing each bread-loaf into fractions, a pair of opposed parallel guide members for confining the bread-loaf fractions to a predetermined path of movement, and conveyer means disposed entirely for movement for progressing the loaf fractions therealong.

14. In bread-packaging mechanism, a table adapted to support a plurality of bread-loaves for slidable movement thereacross, said table having, intermediate its ends, a bend extending in the direction of travel of the bread-loaves for subdividing each bread-loaf into fractions, a pair of opposed parallel guide members for confining the bread-loaf fractions to a predetermined path of movement, and conveyer means operably mounted over, and having forward and return runs both spaced upwardly from, the table for progressing the loaf fractions therealong.

GUSTAV C. PAPENDICK.